(No Model.)
W. F. BENEDICT.
BASKET.
No. 278,856. Patented June 5, 1883.
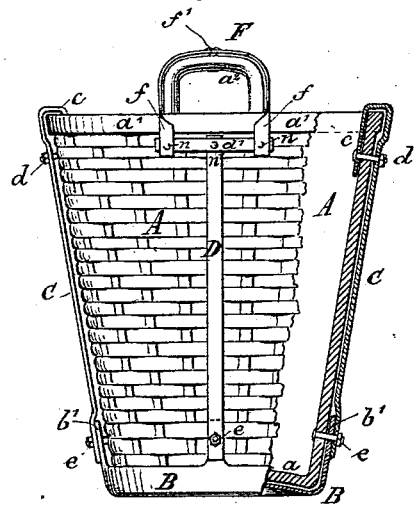
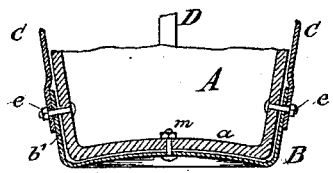
 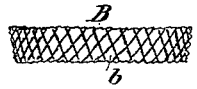
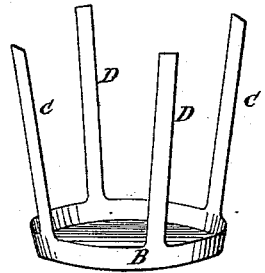
WITNESSES:
Edward Lehfeldt
Rob't W. Matthews
INVENTOR
William F. Benedict.
BY A. W. Almquist
ATTORNEY

UNITED STATES PATENT OFFICE.

WILLIAM F. BENEDICT, OF NEW YORK, N. Y.

BASKET.

SPECIFICATION forming part of Letters Patent No. 278,856, dated June 5, 1883.

Application filed March 15, 1883. (No model.)

*To all whom it may concern:*

Be it known that I, WILLIAM F. BENEDICT, a citizen of the United States, and a resident of New York, in the county of New York and State of New York, have invented certain new and useful Improvements in Baskets, of which the following is a specification.

My invention relates to baskets such as are used for carrying heavy matters, such as coal, oysters, &c. In all such baskets it is evident that, owing to the weight of the same when loaded and lifted, there is great strain upon the handles by which they are carried, and therefore the handles frequently give way. To avoid the extra exertion needed for carrying a basket it is generally dragged along on its bottom by grasping the rim or one of the handles, the effect being to very rapidly wear out or break the bottom, tear the splints, and bend the sides out of shape.

The object of my invention is to overcome this difficulty, and it comprises improved means for strengthening the sides and handles of a basket, strengthening its bottom, and connecting the handles and bottom directly with the bottom-protector, in a manner as will be hereinafter described and claimed.

In the accompanying drawings, Figure 1 represents a side view of my improved splint basket, partly broken out to better show the construction. Fig. 2 is a vertical section of the lower portion of the same. Fig. 3 is a perspective view of the bottom-protector and upright sides attached to or forming part of the same according to my present invention. Fig. 4 is a vertical section of the bottom-protector, formed out of perforated metal plate. Fig. 5 is a side view of the same when made out of wire-cloth.

Like letters of reference indicate like parts in the several figures.

A is the body of an ordinary wooden splint basket. For the sake of plainness and convenience of illustrating the invention, the broken-out portions of the body of the basket A in Figs. 1 and 2 are shown as if they were made of one solid piece, or not formed of interwoven splints; but in reality they will be thus made, as in the portion shown from the outside in Fig. 1.

To strengthen and protect the bottom $a$ of the splint basket I have provided a metallic bottom, B, which is struck up of sheet metal into the correct shape, and fasten the same to the bottom and side of the splint basket by bolts and nuts $m$ $e$.

It being necessary for some purposes—such as for carrying oysters and the like—to allow moisture or liquids to flow out through the bottom of the basket, I provide for such purposes the bottom B with perforations $b$, as shown in Fig. 4; or the said perforations may be formed by making the entire bottom out of wire-cloth, as shown in Fig. 5. In order to strengthen and stiffen the sides of the basket, I then run strips of metal, C, from the bottom B (to which the lower ends of the strip are connected by the aforesaid bolts and nuts $e$) up to and around the brim $a'$ of the basket A, the upper end of the strip C being turned in and secured by passing through the side of the basket and through the outer portion of the said strip a suitable bolt or rivet, $d$, as shown in Fig. 1.

In order to relieve the side of the basket and the handle from the strain due to the weight in carrying the basket loaded, I provide around the upper surface of the ordinary wooden handle, $a^2$, a metallic strip, F, which is fastened to the handle by a small rivet, $f'$, and is bent down upon the sides of the handle, its lower end, $f$, being twisted or turned a quarter of a turn, then fastened with rivets $n$ to the ends of a cross-strip, $d'$. From the center of said cross-strip runs a side strip, D, (similar to the strip C,) down to the bottom B, and is riveted with its lower end to the said bottom in the same manner as are the strips C, the upper end of the strip D being riveted at $n'$ to the center of the aforesaid cross-strip $d'$ of the handle, as shown in Fig. 1. The bottom-plate B may be provided with small upward-projecting strips $b'$, formed in one piece with it, and the aforesaid upright side strips, C D, may be secured to the said projections $b'$, as in Figs. 1 and 2; but I prefer to make the bottom-protecting plate in the form of a shallow vessel, without protecting-strips, as shown in Figs. 4 and 5. The entire strips C D may be formed, together with the bottom B, in one piece, as shown in Fig. 3; but I prefer to make them separately, as before described.

It is evident that the two opposite strips D may be made in one and the same strip continuous across the bottom of the basket, and the strip C may be struck in the same manner.

The central bottom-bolt, $m$, may be passed through the two continuous strips at the point where they cross each other; but I prefer to form the connection by means of the bottom-protector B, as shown.

In the drawings the lower ends of the side strips C are shown as riveted upon the outside of the bottom-protector B; but they may be preferably riveted to the inside thereof instead.

It is evident that the strips C D F and bottom-protector B may be made of any suitable hard and strong material; but I prefer sheet metal, as before stated.

Having thus described my invention, I claim as new and desire to secure by Letters Patent—

1. In combination with the basket A and handle $a^2$, the strip F, covering the said handle, cross-strip $d'$, riveted to the ends $f$ of the said strip F, and the side strip D, secured to the said cross-strip $d'$ and connected by its lower end to the bottom of the basket, substantially as and for the purpose hereinbefore set forth.

2. The combination of the basket A, the metallic bottom-protector B, the rim surrounding side strip C, the handle $a^2$, the metallic strip F, the cross-strip $d'$, and side strip D, all constructed and connected together substantially as and for the purpose hereinbefore set forth.

In testimony that I claim the foregoing as my invention I have signed my name, in presence of two witnesses, this 13th day of March, 1883.

WILLIAM F. BENEDICT.

Witnesses:
 EDUARD ARFELT,
 ROBT. W. MATTHEWS.